United States Patent
Lawford

[15] 3,696,659
[45] Oct. 10, 1972

[54] INSTRUMENT PRESSURE CALIBRATION METHOD AND APPARATUS

[72] Inventor: Victor Nicholas Lawford, Pasadena, Calif.

[73] Assignee: International Telephone and Telegraph Corporation, New York, N.Y.

[22] Filed: Aug. 25, 1971

[21] Appl. No.: 174,710

[52] U.S. Cl. .................................................73/4 R
[51] Int. Cl. ...........................................G01l 27/00
[58] Field of Search....................73/4 R, 3, 395, 420

[56] References Cited

UNITED STATES PATENTS

| | | | |
|---|---|---|---|
| 2,725,749 | 12/1955 | Green | 73/395 |
| 2,881,617 | 4/1959 | Deis | 73/395 |
| 3,217,545 | 11/1965 | Kreisman | 73/400 |
| 3,398,570 | 8/1968 | Cowan | 73/4 R |

Primary Examiner—S. Clement Swisher
Attorney—C. Cornell Remsen, Jr. et al.

[57] ABSTRACT

A method of and apparatus for calibrating a differential pressure unit for indicating the difference between the pressures at two points across an orifice or the like in a liquid sodium cooling line of a nuclear reactor employed in producing electric power. The line pressures are transmitted to the unit by a first set of conduits containing a mixture of liquid sodium and liquid potassium. An auxiliary inlet to each of the two pressure chambers of the unit are connected to a second set of conduits that communicate with bellows inside of two sealed, oil filled enclosures. When the enclosures are sealed, the bellows therein are locked in place. For calibration, the mixture in the first set of conduits is frozen, the enclosure seals are removed, and known pressures are applied to the enclosures. After resealing the enclosures and unfreezing the mixture, the unit is again ready for continuous operation.

6 Claims, 1 Drawing Figure

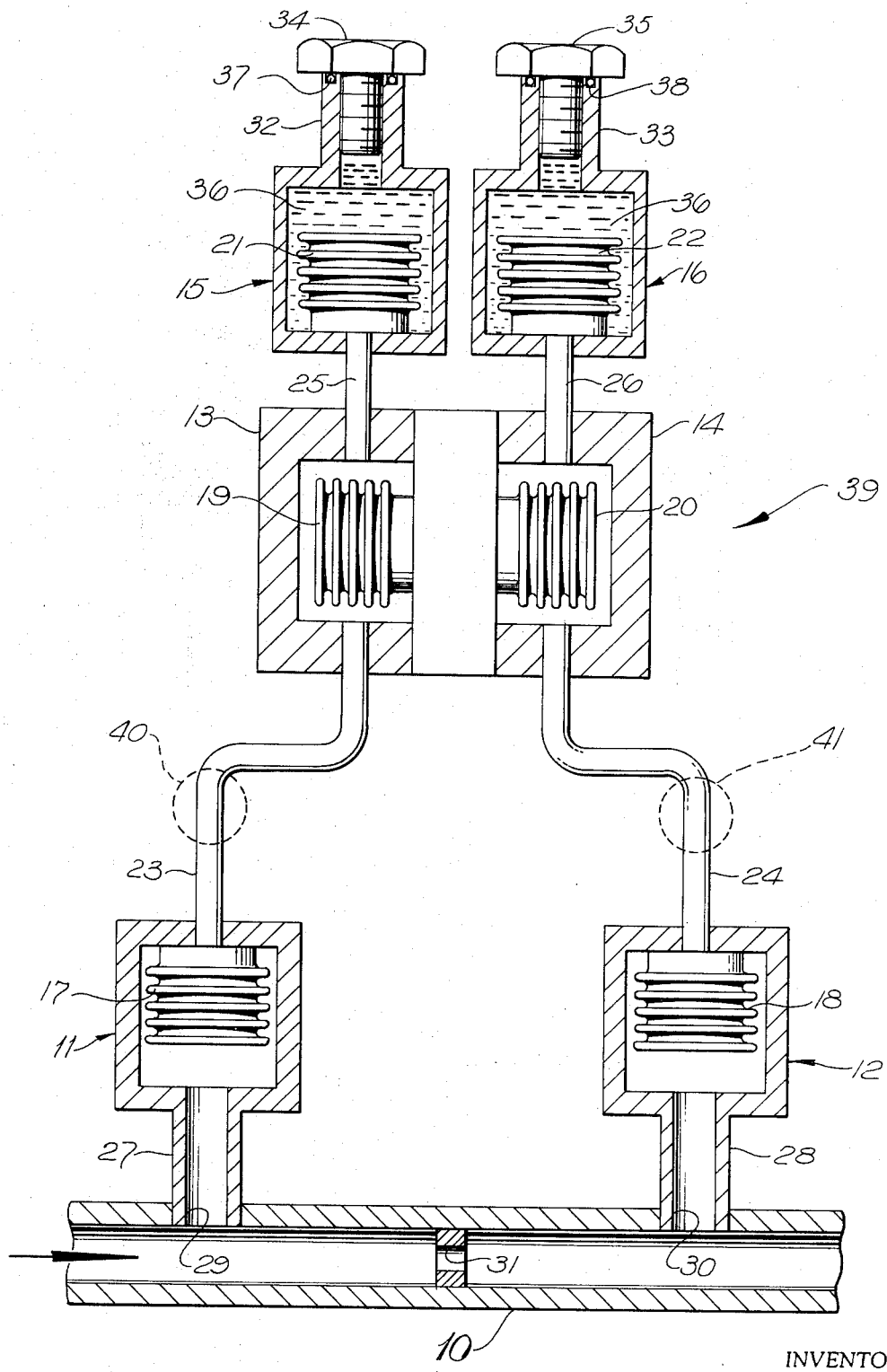

INSTRUMENT PRESSURE CALIBRATION METHOD AND APPARATUS

BACKGROUND OF THE INVENTION

This invention relates to the calibration art, and more particularly, to a method of and apparatus for calibrating a differential pressure unit or the like.

Differential pressure (DP) units are utilized in metering the flow of liquid sodium in cooling lines of atomic reactors employed in the generation of electric power. However, the DP units must also receive liquid sodium, liquid potassium, and preferably a mixture of the two. Unfortunately, the sodium will oxidize and the potassium will ignite at room temperature. Thus it is a disadvantage of the prior art that no way has been devised to calibrate the DP units without opening the sodium-potassium (NaK) lines to the atmosphere.

SUMMARY OF THE INVENTION

In accordance with the present invention, the above-described and other disadvantages of the prior art are overcome by freezing the NaK inlet to a DP unit and applying a known calibration pressure through an auxiliary inlet by the use of a bellows closing off the system. The NaK is thus never exposed to air, yet the DP unit may be calibrated.

The above-described and other advantages of the present invention will be better understood from the following detailed description when considered in connection with the accompanying drawing.

BRIEF DESCRIPTION OF THE DRAWING

In the drawing which is to be regarded as merely illustrative:

The FIGURE is a vertical sectional view through apparatus constructed in accordance with the present invention.

DESCRIPTION OF THE PREFERRED EMBODIMENT

In the FIGURE, a flow section of pipe is indicated at 10. This flow section may carry liquid sodium used in cooling atomic reactors for atomic power plants. Means providing sealed enclosures are indicated at 11, 12, 13, 14, 15 and 16. Means 11–16 have hollow metal bellows 17, 18, 19, 20, 21 and 22 sealed to one wall thereof, respectively. The operation of any one bellows is typical. For example, should the pressure inside means 11 increase, bellows 17 will contract and increase the pressure inside means 13 through a hollow tube 23. Means 12 and means 14 are similarly connected by a hollow tube 24. Means 13 and means 15 are connected by a hollow tube 25. Means 14 and means 16 are connected by a hollow tube 26.

Each of the tubes 23, 24, 25 and 26 is sealed to its corresponding means at each end thereof.

Means 11 and 12 are welded in a fluid tight manner to flow section 10 and have main inlets 27 and 28 which lie in communication with holes 29 and 30, respectively, through flow section 10. The lower ends of tubes 23 and 24 open into the interiors of bellows 17 and 18, respectively. The upper ends of tubes 23 and 24 form main inlets to means 13 and 14. The lower ends of tubes 25 and 26 form auxiliary inlets to means 13 and 14.

Flow section 10 has an orifice 31 therein. However, a venturi may alternatively be provided.

The upper ends of tubes 25 and 26 are open to the interior of bellows 21 and 22, respectively.

The upper ends of means 15 and 16 have inlets 32 and 33, respectively, into which cap screws 34 and 35 are threaded. The interiors of means 15 and 16 contain a silicone oil of any conventional variety as indicated at 36. Cap screws 34 and 35 are sealed to inlets 32 and 33 by O-rings 37 and 38.

The structure indicated at 39 is a differential pressure unit. Unit 39 includes means 13 and 14, and bellows 19 and 20. Unit 39 may be any conventional differential pressure unit. For example, unit 39 may be, if desired, identical to that disclosed in U.S. Pat. No. 2,664,749. In such a case, an incompressible fluid fills bellows 19 and 20 and can flow through an opening in unit 39. The bellows are connected by a shaft which operates an indicator, the indicator indicating the difference between the pressure in means 11 and the pressure in means 12.

As shown, no air is allowed to enter any space inside means 15 and 16. The sealed cap screws 34 and 35 thus hold bellows 21 and 22 immovable inside means 15 and 16. Thus, any change in pressure in means 11 causes bellows 19 to move accordingly, although bellows 21 is not moved. Similarly, any change in pressure inside means 12 causes bellows 20 to move, but not bellows 22. Unit 39 thus indicates the differential pressure. Should it be necessary to calibrate unit 39, dry ice is applied in the areas of dotted lines 40 and 41 to freeze the fluid which fills tubes 23 and 24. This fluid will generally be a mixture of sodium and potassium, but may be any mixture thereof or 100 percent sodium or 100 percent potassium. In all cases, the fluid in tubes 23 and 24 is liquid. Certain mixtures of sodium and potassium are liquid at room temperature.

As might be expected, liquid sodium fills not only flow section 10 but also means 11 and 12. The interiors of bellows 17, 18, 21 and 22 are filled with the sodium-potassium (NaK) mixture. The NaK mixture also fills tubes 25 and 26 and the interiors of means 13 and 14.

After the NaK mixture has been frozen at 40 and 41, cap screws 34 and 35 are removed, and air, for example, at a known pressure, is introduced to inlets 32 and 33, and unit 39 thereby calibrated.

All sealed connections are preferably welded.

For increased accuracy and calibration, an allowance for the hydrostatic head of the silicone fluid during calibration may be made.

After calibration, means 15 and 16 may be replenished with silicone fluid so that they are completely filled. Cap screws 34 and 35 are then re-installed. Tubes 23, 24, 25 and 26 may actually have a small hole therethrough of a capillary size. Freezing is thus performed easily. If desired, the areas at 40 and 41 may be warmed to melt the NaK.

In installing cap screws 34 and 35, care should be taken to prevent a "piston action" from generating excessive pressures and transferring NaK from bellows 21 and 22 to bellows 17 and 18.

What is claimed is:

1. The method of calibrating a pressure sensitive device, said method comprising the steps of: connecting a first fluid conduit with a pressure receiving chamber in the device; providing a liquid filled chamber; providing a bellows in said liquid filled chamber in communication with said pressure receiving chamber; freezing the fluid in said conduit at a point intermediate its ends; and introducing another fluid under a known pressure into said liquid filled chamber.

2. The invention as defined in claim 1, wherein the fluid in said conduit is a mixture of liquified sodium and potassium, said other fluid being a gas.

3. Apparatus for instrument pressure calibration, said apparatus comprising: a differential pressure unit including first and second chamber means; second, third, fourth, fifth and sixth chamber means, each of said chamber means including a fluid tight enclosure having a main inlet, and a hollow bellows inside each enclosure, each said bellows having a closed end and an open end sealed to one interior wall of its corresponding enclosure, said one interior wall of each enclosure having an outlet to permit fluid flow into and out of the interior of the corresponding bellows; a flow section of pipe having means to produce different pressures at first and second spaced points therealong; a first conduit providing sealed fluid communication between the third chamber means outlet and the first chamber means main inlet; a second conduit providing sealed fluid communication between the fourth chamber means outlet and the second chamber means main inlet, the enclosures of said first and second chamber means each having a hole through a wall thereof in communication with the main inlet thereof; a third conduit providing sealed fluid communication between the first chamber means auxiliary inlet and the fifth chamber means outlet; a fourth conduit providing sealed fluid communication between the second chamber means auxiliary inlet and the sixth chamber means outlet; a first liquid filling all of the bellows of said third, fourth, fifth and sixth chamber means, and all of said conduits, said fifth and sixth chamber means main inlets being positioned to open vertically upwardly; a releasable fluid tight closure sealing shut each of the main inlets of said fifth and sixth chamber means; and a second liquid filling the interior of the enclosure of each of said fifth and sixth chamber means, said first liquid being oxidizable in air.

4. The invention as defined in claim 3, wherein said first liquid includes a liquified mixture of sodium and potassium.

5. The invention as defined in claim 4, wherein said second liquid fills said fifth and sixth chamber means enclosures full, said closures being tight so as to render said fifth and sixth chamber means bellows immobile in their corresponding enclosures.

6. The invention as defined in claim 5, wherein said second liquid includes a silicone oil.

* * * * *